United States Patent
Olson et al.

(10) Patent No.: US 11,662,023 B2
(45) Date of Patent: May 30, 2023

(54) PLUNGER SEAL FOR DRIVESHAFT CONNECTION

(71) Applicant: Bell Helicopter Textron Inc., Fort Worth, TX (US)

(72) Inventors: Eric Stephen Olson, Fort Worth, TX (US); David Russell Bockmiller, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 1397 days.

(21) Appl. No.: 15/911,143

(22) Filed: Mar. 4, 2018

(65) Prior Publication Data

US 2019/0271398 A1  Sep. 5, 2019

(51) Int. Cl.
| | |
|---|---|
| B64C 29/00 | (2006.01) |
| F16J 15/3224 | (2016.01) |
| B64C 3/56 | (2006.01) |
| F16H 57/04 | (2010.01) |
| F16C 3/02 | (2006.01) |
| F16D 1/10 | (2006.01) |
| F16C 33/72 | (2006.01) |

(52) U.S. Cl.
CPC ............ *F16J 15/3224* (2013.01); *B64C 3/56* (2013.01); *B64C 29/0033* (2013.01); *F16C 3/02* (2013.01); *F16C 33/723* (2013.01); *F16D 1/10* (2013.01); *F16H 57/043* (2013.01); *F16D 2001/103* (2013.01)

(58) Field of Classification Search
CPC . F16J 15/3224; F16C 3/02; F16D 1/10; F16D 2001/103; F16H 57/043; B64C 29/0033; B64C 29/0075
See application file for complete search history.

(56) References Cited

U.S. PATENT DOCUMENTS

| | | | | |
|---|---|---|---|---|
| 192,026 | A * | 6/1877 | Sleeper ................ | F16J 15/3224 277/505 |
| 3,608,910 | A * | 9/1971 | Tyler ........................ | F16J 15/38 415/174.3 |
| 3,612,630 | A * | 10/1971 | Rosensweig ............. | F16J 15/43 310/90.5 |
| 4,217,120 | A * | 8/1980 | Reynolds ............... | B64D 33/00 55/409 |

(Continued)

*Primary Examiner* — Eugene G Byrd
*Assistant Examiner* — L. Susmitha Koneru
(74) *Attorney, Agent, or Firm* — Lightfoot & Alford PLLC (57) ABSTRACT

Systems and methods include providing an aircraft with a fuselage and a wing assembly rotatable relative to the fuselage about a stow axis between a flight position and a stowed position. The aircraft includes an engine reduction gearbox having a retractable driveshaft that selectively engages the mid-wing gearbox via axially translatable motion along a rotation axis when the wing assembly is in the flight position. The mid-wing gearbox includes a plunger seal that is displaced in response to contact with the retractable driveshaft. Displacement of the plunger seal allows lubricant to flow through an inner bore in the retractable driveshaft, across splines of the retractable driveshaft and the mid-wing gearbox, and through lubrication ports in the mid-wing gearbox to lubricate the engine reduction gearbox, splines of the retractable driveshaft and the mid-wing gearbox, and the mid-wing gearbox via a single lubrication system.

18 Claims, 7 Drawing Sheets

(56) References Cited

U.S. PATENT DOCUMENTS

| | | | | | |
|---|---|---|---|---|---|
| 4,358,253 | A | * | 11/1982 | Okano | F01D 25/166 |
| | | | | | 417/407 |
| 4,557,351 | A | * | 12/1985 | Volk | F01B 31/10 |
| | | | | | 184/18 |
| 5,448,944 | A | * | 9/1995 | Line | F16C 35/0635 |
| | | | | | 100/88 |
| 5,961,388 | A | * | 10/1999 | Breidenbach | F16J 3/042 |
| | | | | | 277/630 |
| 2012/0078216 | A1 | * | 3/2012 | Smith | A61M 5/145 |
| | | | | | 604/93.01 |
| 2015/0101694 | A1 | * | 4/2015 | Forrest | F04B 53/164 |
| | | | | | 137/861 |
| 2016/0084369 | A1 | * | 3/2016 | Poster | F16N 7/00 |
| | | | | | 184/6.12 |

* cited by examiner

PLUNGER SEAL FOR DRIVESHAFT CONNECTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Aircraft and/or other vehicles and machinery often include many dynamic components that interface with other similar components. Some of these dynamic components include the capability to be selectively engaged and disengaged in order to alter the configuration or operation of another component of the aircraft and/or other vehicle or machinery. When disengaged, intricate features such as gear splines, fluid passages, and the like may be exposed to outside environmental elements. These outside environmental elements may contaminate the exposed features, which may lead to an increased buildup of contamination, oxidation, wear, and/or ultimate failure of these components.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
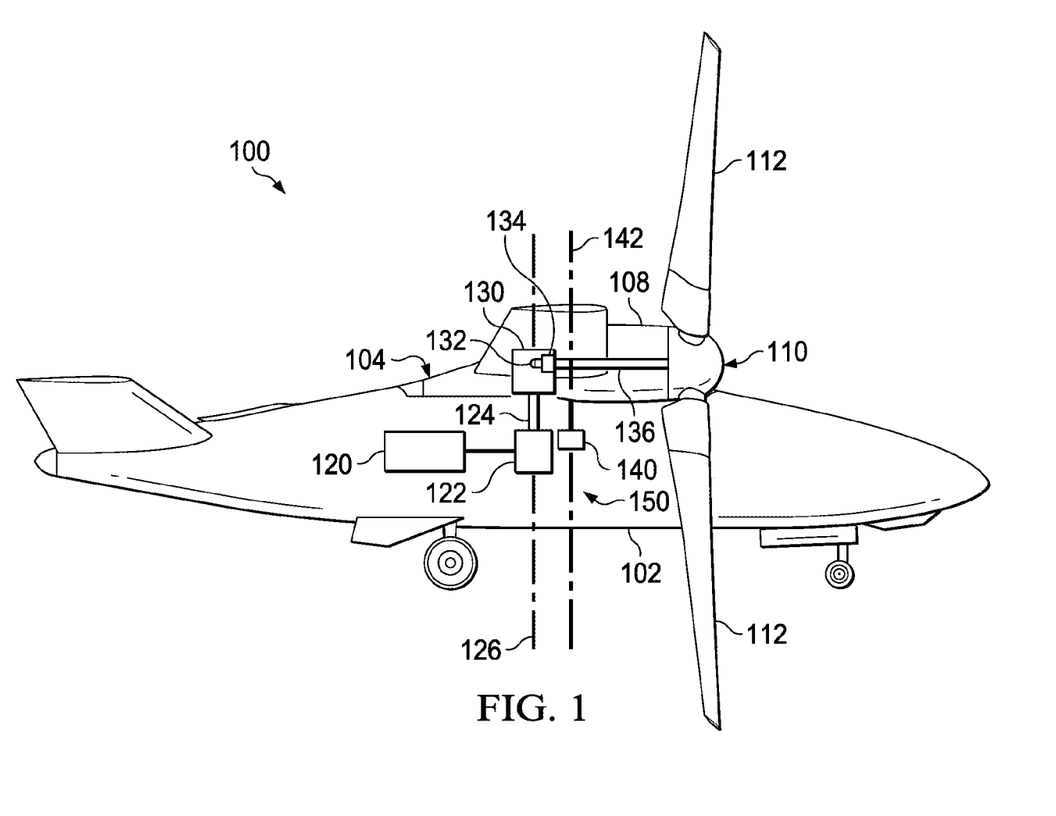
FIG. 1 is a side view of an aircraft according to this disclosure and configured in a flight configuration.
Figure 2:
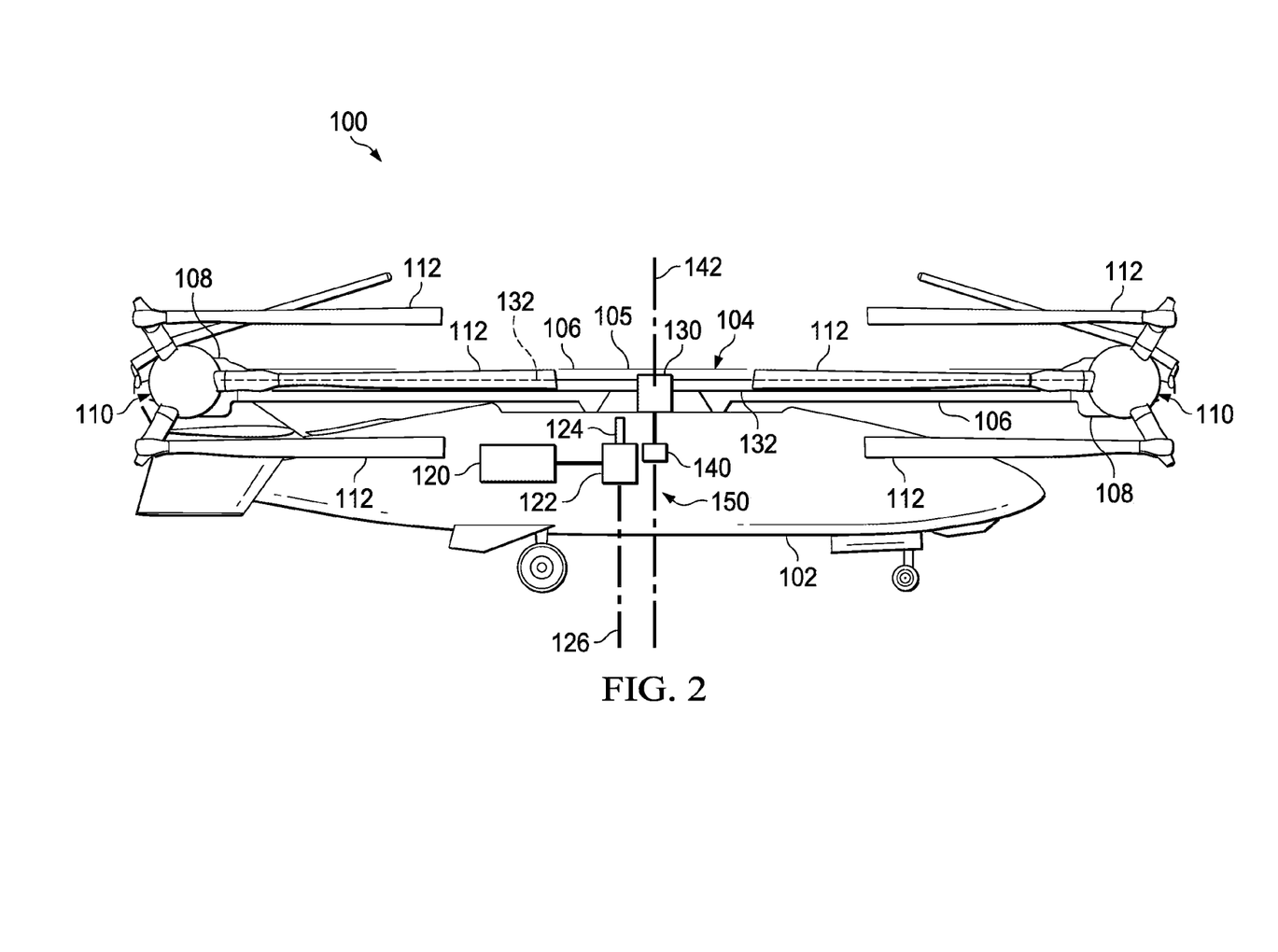
FIG. 2 is a side view of the aircraft of FIG. 1 configured in a stowed configuration.

Referring now to FIGS. 1 and 2, side views of an aircraft 100 configured in a flight configuration and a stowed configuration, respectively, are shown according to this disclosure. In the embodiment shown, aircraft 100 is a tiltrotor. However, in other embodiments, aircraft 100 may be any other type of aircraft (e.g. fixed-wing aircraft, vertical take-off and landing (VTOL) aircraft, "manned" or "unmanned" drone, etc.). Aircraft 100 generally comprises a fuselage 102 and a stowable wing assembly 104 comprising a selectively rotatable wing body 105 and a plurality of wings 106 extending therefrom. Each wing 106 comprises a pylon 108 comprising a rotor assembly 110 having a plurality of rotor blades 112 coupled thereto. Each pylon 108 is selectively pivotable between a horizontal orientation and a vertical orientation with respect to the fuselage 102 and associated wing 106 to adjust the thrust angle and transition the aircraft 100 between an airplane mode and a helicopter mode. Accordingly, the airplane mode is associated with a more horizontally-oriented thrust angle and propelling the aircraft 100 forward in flight, while the helicopter mode is associated with a more vertically-oriented thrust angle and propelling the aircraft 100 to and from a landing area.

Aircraft 100 also comprises a drive component carried in the fuselage 102. In the embodiment shown, the drive component comprises an internal combustion engine 120 coupled to an engine reduction gearbox ("ERGB") 122 comprising a retractable driveshaft 124. However, in other embodiments, the drive component may comprise a direct-drive electric motor, a direct-drive engine, a motor and gearbox combination, or an engine and a redirection gearbox, each comprising a retractable driveshaft 124. In the embodiment shown, operation of the internal combustion engine 120 causes the retractable driveshaft 124 to rotate about its rotation axis 126. The retractable driveshaft 124 is selectively extended and retracted axially along rotation axis 126 to engage (shown in FIG. 1) and disengage (shown in FIG. 2) from an auxiliary component, such as mid-wing gearbox ("MWGB") 130, disposed within the selectively rotatable wing body 105 of the wing assembly 104. The retractable driveshaft 124 may be actuated electrically, electro-mechanically, hydraulically, and/or mechanically. While in the embodiment shown, the retractable driveshaft 124 is selectively actuated and retracted vertically with respect to the fuselage 102, in other embodiments, the retractable driveshaft 124 may be selectively actuated and retracted longitudinally along a length of the fuselage 102 and/or laterally with respect to the fuselage 102. The MWGB 130 is operatively coupled to an interconnect driveshaft 132 extending through each wing 106 to a pylon gearbox 134 disposed in each pylon 108. Each pylon gearbox 134 is coupled to the associated rotor assemblies 110 through a rotor mast 136.

Aircraft 100 further comprises a wing assembly rotation system 140 configured to selectively rotate the wing assembly 104 with respect to the fuselage 102 about stow axis 142. Most notably, the stow axis 142 is offset from the rotation axis 126 of the retractable driveshaft 124. More specifically, the stow axis 142 is displaced longitudinally along a length of the fuselage 102 with respect to the rotation axis 126 of the retractable driveshaft 124. In some embodiments, the offset between the stow axis 142 and rotation axis 126 may be about twelve inches. The location of the rotation axis 126 is generally set by the location of the interconnect driveshafts 132 and/or the MWGB 130. The stow axis 142 is generally selected to center the wing assembly 104 over the fuselage 102, thereby reducing the overall footprint of the aircraft 100 when the wing assembly 104 is fully rotated. Further, in some embodiments, offsetting the stow axis 142 towards a more forward portion of the wing assembly 104 may provide structural benefits, such as allowing rotation of the wing assembly 104 in a thicker, more structurally rigid portion of the wing assembly 104. Additionally, as will be discussed further herein, it will be appreciated that since the retractable driveshaft 124 extends at least partially into the wing body 105 of the wing assembly 104 when the retractable driveshaft 124 is engaged with the MWGB 130, the retractable driveshaft 124 is configured to allow for rotation of the wing assembly 104 by selectively disengaging from the MWGB 130.

As shown in FIG. 1, the retractable driveshaft 124 is selectively extended vertically and engaged with the MWGB 130, and the wing assembly 104 is configured in the flight position. Thus, when the retractable driveshaft 124 is engaged with the MWGB 130 as shown in FIG. 1, rotation of the retractable driveshaft 124 imparted by the internal combustion engine 120 is transmitted through the MWGB 130 to the interconnect driveshafts 132 and the rotor masts to impart rotation to the counter-rotating rotor assemblies 110. As shown in FIG. 2, the retractable driveshaft 124 is selectively retracted and disengaged with the MWGB 130, and the wing assembly 104 is configured in a stowed position. After the retractable driveshaft 124 is disengaged with the MWGB 130, the wing assembly 104 may be selectively rotated by the wing assembly rotation system 140 relative to the fuselage 102 about the stow axis 142 in a clockwise direction as viewed from the top of the aircraft 100 until the wing assembly 104 reaches the stowed position. In the stowed position, it will be appreciated that the retractable driveshaft 124 is misaligned from the MWGB 130. Accordingly, when the retractable driveshaft 124 is disengaged from the MWGB 130, rotation of the retractable driveshaft 124 will not impart rotation to the rotor assemblies 110.

In some embodiments, the stowed configuration of the wing assembly 104 may be reached after the wing assembly 104 is rotated about ninety degrees. Furthermore, in some embodiments, it will be appreciated that the wing assembly 104 may be rotated relative to the fuselage 102 about the stow axis 142 in a counter-clockwise direction. It will be appreciated that rotation of the wing assembly 104 allows the aircraft 100 to be parked, stowed, and/or driven into an entrance of a hangar while reducing the overall footprint of the aircraft 100, thereby allowing for more compact storage of aircraft 100 and increased storage capacity of multiple aircraft 100. Additionally, it will be appreciated that the ERGB 122 comprising the retractable driveshaft 124 and the MWGB 130 may be referred to as the drive system 150 of aircraft 100, collectively cooperating to provide rotation to the rotor assemblies 110 while also providing lubrication to the ERGB 122 and the MWGB 130 when the retractable driveshaft 124 is engaged with the MWGB 130.

Figure 3:
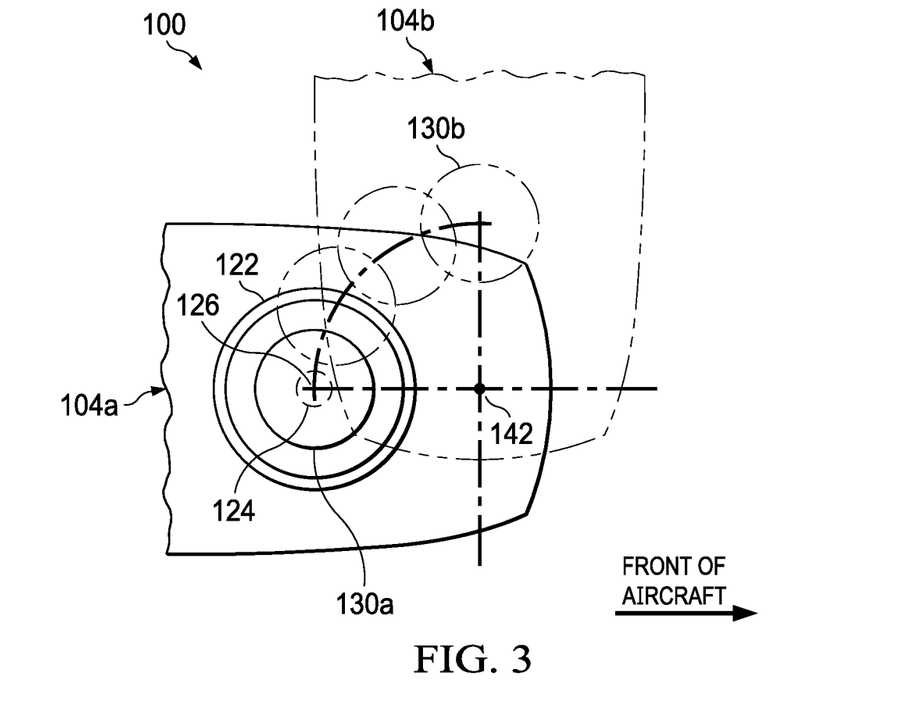
FIG. 3 is a top view of the position of a mid-wing gearbox ("MWGB") during rotation of the wing assembly of the aircraft of FIG. 1.

Referring now to FIG. 3, a top view of the position of the MWGB 130 during rotation of the wing assembly 104 of the aircraft 100 of FIGS. 1 and 2 is shown according to this disclosure. As shown, the wing assembly 104 may be rotated relative to the fuselage 102 about the stow axis 142 between the flight position 104*a* (corresponding to FIG. 1) and the stowed position 104*b* (corresponding to FIG. 2). In this embodiment, the wing assembly 104 is rotated about ninety degrees between the flight position 104*a* and the stowed position 104*b*. Additionally, since the MWGB 130 is disposed within the wing assembly 104, the MWGB 130 sweeps along a radial path defined by the distance of the MWGB 130 from the stow axis 142. In some embodiments, the offset between the rotation axis 126 and the stow axis 142 may be about twelve inches, such that the MWGB 130 sweeps along a twelve inch radial path with respect to the stow axis 142. Thus, the MWGB 130 is rotated between the flight position 130*a* (flight position 104*a* of the wing assembly 104), where the MWGB 130 is aligned with the retractable driveshaft 124, and the stowed position 130*b* (stowed position 104*b* of the wing assembly 104), where the MWGB 130 is misaligned with the retractable driveshaft 124.

Figure 4A:
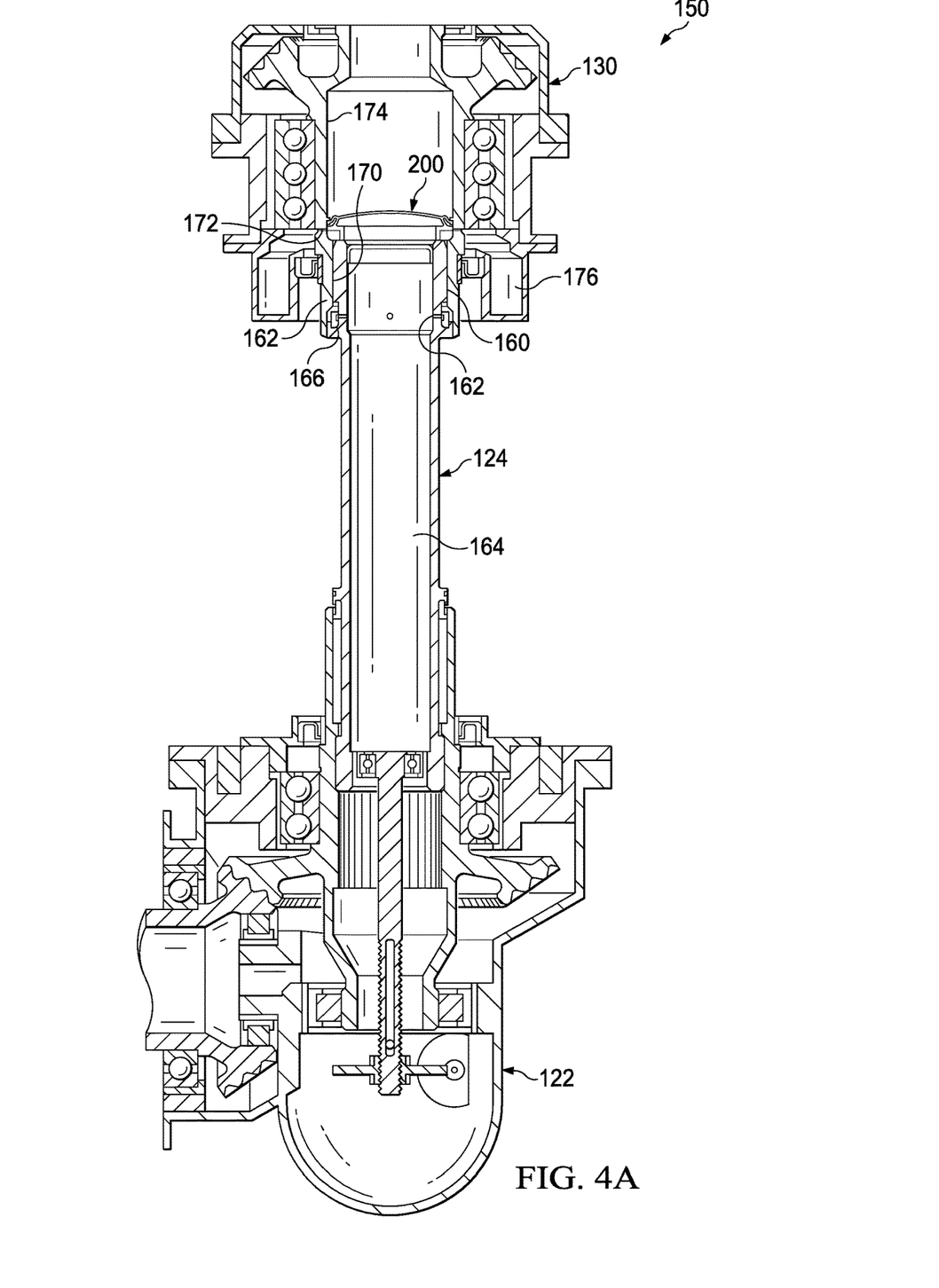
FIG. 4A is a cross-sectional side view of a drive system according to this disclosure of the aircraft of FIG. 1 with a retractable driveshaft engaged with the MWGB of the aircraft of FIG. 1.
Figure 4B:
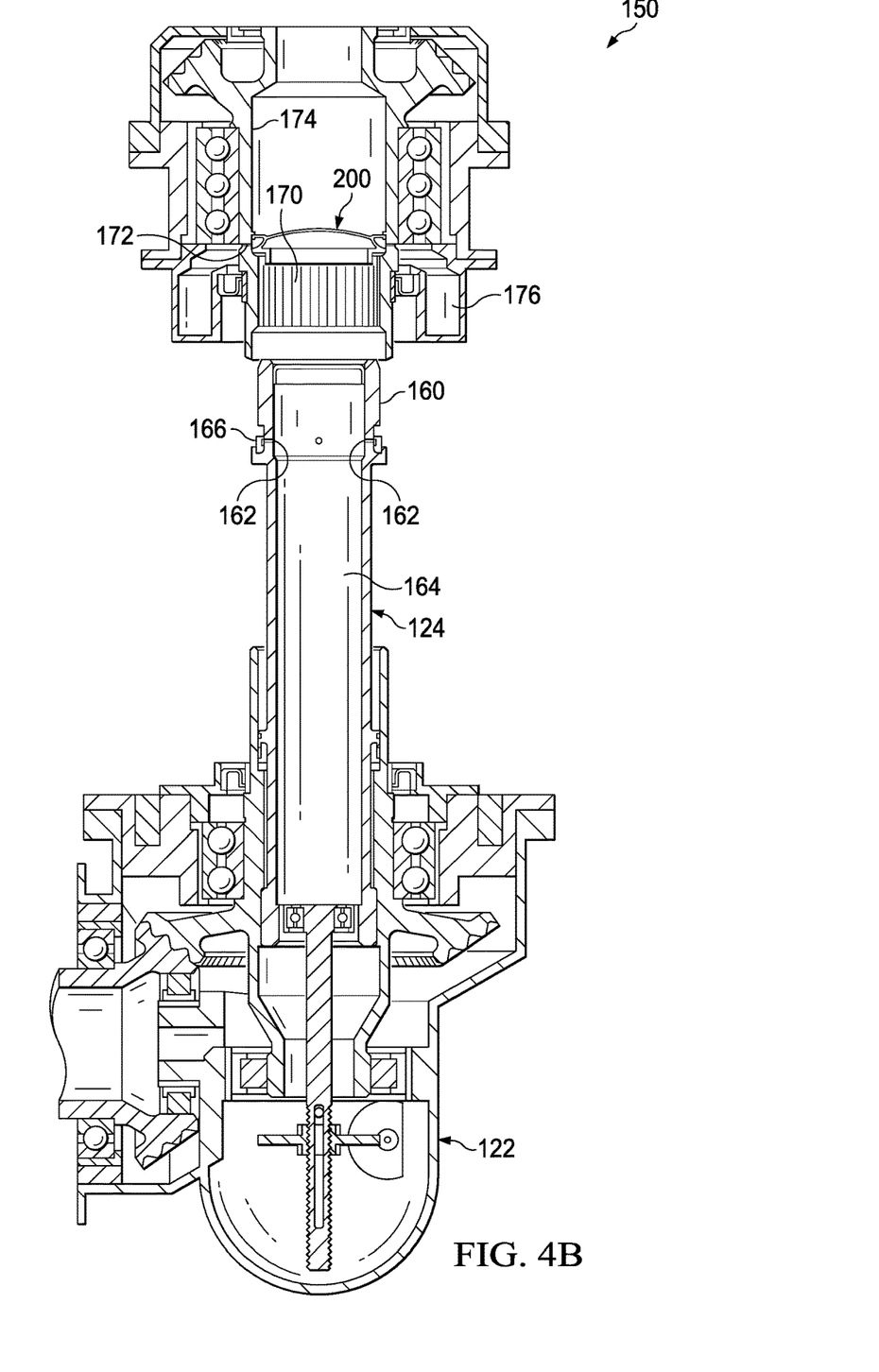
FIG. 4B is a cross-sectional side view of the drive system of FIG. 4A with the retractable driveshaft disengaged from the MWGB.

Referring now to FIGS. 4A and 4B, cross-sectional side views of the drive system 150 are shown according to this disclosure with the retractable driveshaft 124 engaged with and disengaged from the MWGB 130, respectively. Engagement of the retractable driveshaft 124 shown in FIG. 4A corresponds to FIG. 1, while the disengagement of the retractable driveshaft 124 in FIG. 4B corresponds to FIG. 2. The retractable driveshaft 124 is configured to engage a receiver 174 of the auxiliary component carried in the wing assembly 104. In this embodiment, the retractable driveshaft 124 comprises a plurality of splines 160 configured to align and interlock with a plurality of splines 170 disposed on the receiver 174 of the MWGB 130. The interlocked relationship between the splines 160, 170 translates rotation of the retractable driveshaft 124 to the MWGB 130. Additionally, the drive system 150 also comprises a lubrication system having a plurality of lubrication ports 162 disposed in the retractable driveshaft 124, a plurality of lubrication ports 172 disposed through the rotatable receiver 174 of the MWGB 130, a sump 176 associated with the MWGB 130, and a plunger seal 200.

The lubrication ports 162 in the retractable driveshaft 124 are disposed radially about the retractable driveshaft 124 below the splines 160 and connect an inner bore 164 of the retractable driveshaft 124 to outer surfaces of the retractable driveshaft 124. The lubrication ports 162 allow a lubricant (e.g., oil) traveling through the inner bore 164 to pass to the outer surfaces of the retractable driveshaft 124. When the retractable driveshaft 124 is engaged and received within the receiver 174 of the MWGB 130, it will be appreciated that the lubrication ports 162 are also received within the receiver 174 of the MWGB 130. This allows oil traveling from an inner bore 164 of the retractable driveshaft 124 through the lubrication ports 162 to lubricate the splines 160, 170. Additionally, in some embodiments, lubrication ports 162 may be covered by a centrifugal seal 166 that opens in response to rotation of the retractable driveshaft 124, thereby allowing oil to pass through the lubrication ports 162 only when the retractable driveshaft 124 is rotated.

The plunger seal 200 is disposed within the receiver 174 of the MWGB 130. The plunger seal 200 is configured to cover the lubrication ports 172 disposed radially about the receiver 174 of the MWGB 130 and prevent oil from passing through the lubrication ports 172 when the retractable driveshaft 124 is disengaged from the MWGB 130. The plunger seal 200 is further configured to be collapsible, deformable, displaceable, and/or axially translatable when the retractable driveshaft 124 is engaged with the MWGB 130. Thus, when the retractable driveshaft 124 is engaged with the MWGB 130, the plunger seal 200 is at least partially displaced to expose the lubrication ports 172 and connect the receiver 174 in fluid communication with the sump 176 through the lubrication ports 172. In some embodiments, the plunger seal 200 may be displaced via contact with the retractable driveshaft 124 upon engagement of the retractable driveshaft 124 with the MWGB 130. However, in some embodiments, the plunger seal 200 may be displaced by the pressure of the oil passing through the lubrication system, the pressure of the oil being induced, for example, by an oil pump or by rotation of the retractable driveshaft 124. This allows oil traveling through lubrication ports 162 to pass upwards through the receiver 174, across the splines 160, 170, and through the lubrication ports 172 to the sump 176. Further, it will be appreciated that the lubrication ports 172 are disposed above the splines 170 of the MWGB 130 in order to allow the oil to lubricate the splines 160, 170 prior to exiting the receiver 174 into the sump 176 of the MWGB 130.

The lubrication system is configured to provide lubrication of the entire drive system 150. Thus, a single lubrication is shared between the ERGB 122 and the MWGB 130. The lubrication system provides lubrication to the splines 160, 170 when the retractable driveshaft 124 is engaged with the MWGB 130, while maintaining the ability to disengage the retractable driveshaft 124 from the MWGB 130 without exposing the inside of the gearboxes 122, 130 to the outside environment. Protection from the outside environment is thus provided by the selectively displaceable seals 166, 200, which also prevent oil leakage through the lubrication ports 162, 172. Thus, total lubrication of the drive system 150 and protection from elements in the outside environment are both achieved. Additionally, while not shown, the lubrication system may also comprise a pump configured to pressurize oil returning from the sump 176 of the MWGB 130 through the lubrication system by pumping the oil up the inner bore 164 of the retractable driveshaft 124, through the lubrication ports 162, across the splines 160, 170, and then out the lubrication ports 172 into the sump 176 of the MWGB 130. From the sump 176, the oil may be recirculated through at least one scavenge port (not shown) disposed in the sump 176, whereby the lubrication process may continue. Furthermore, it will be appreciated that in some embodiments, the flow of oil through the lubrication may be reversed depending on the configuration of the aircraft 100. Still further, in alternative embodiments, the lubrication system may not comprise a pump and instead utilize rotation of the retractable driveshaft 124 to move the oil to provide lubrication to the drive system 150.

Figure 5A:
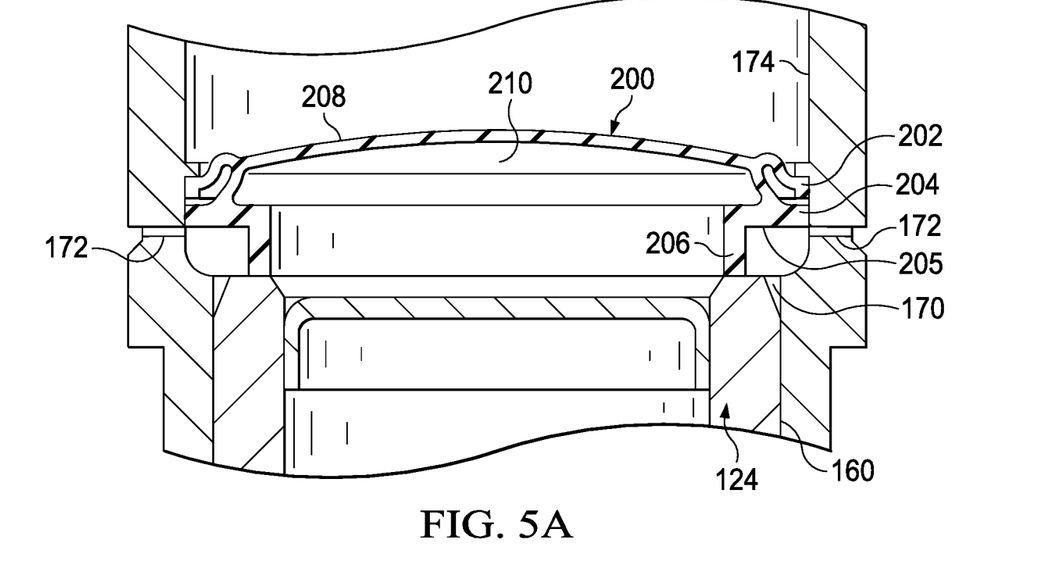
FIG. 5A is a cross-sectional side of a plunger seal according to this disclosure with the retractable driveshaft engaged with the MWGB.
Figure 5B:
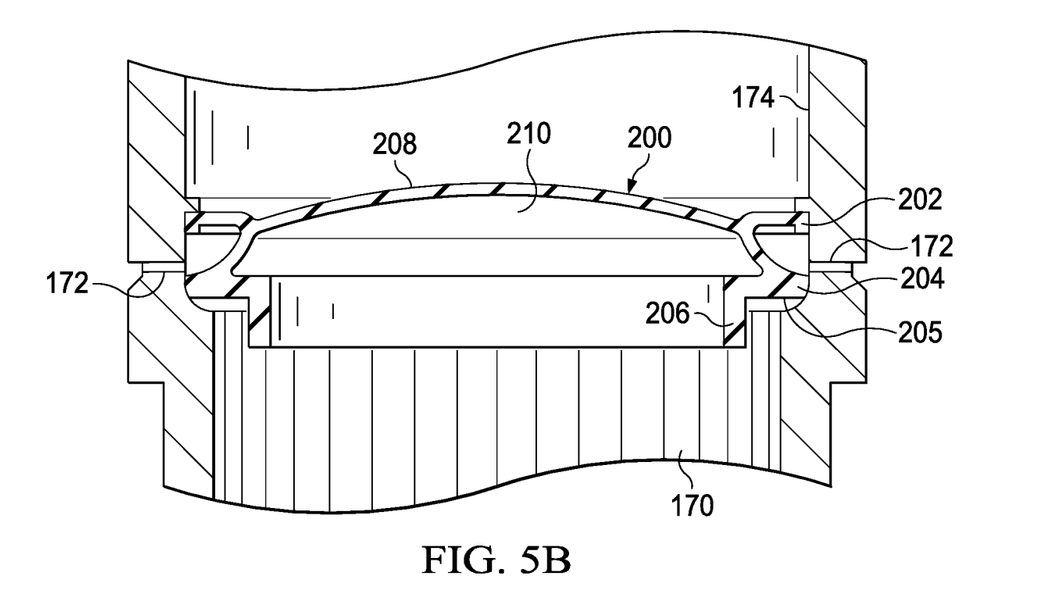
FIG. 5B is a cross-sectional side view of the plunger seal of FIG. 5A with the retractable driveshaft disengaged from the MWGB.

Referring now to FIGS. 5A and 5B, cross-sectional side views of the plunger seal 200 of FIGS. 4A and 4B are shown according to this disclosure with the retractable driveshaft 124 engaged with and disengaged from the MWGB 130, respectively. Plunger seal 200 generally comprises an upper flange 202 that is captured by, secured to, or attached to the receiver 174 of the MWGB 130. The upper flange 202 is fixed with respect to the receiver 174 of the MWGB 130, such that the upper flange 202 does not displace with respect to the receiver 174. Plunger seal 200 also comprises a lower flange 204 disposed below the upper flange 202. Lower flange 204 forms a seal against the receiver 174 of the MWGB 130. The lower flange 204 comprises a substantially flat lower surface 205 from which a cylindrically-shaped driveshaft interface 206 extends. The driveshaft interface 206 is configured to make contact and interface with an upper end of the retractable driveshaft 124 when the retractable driveshaft 124 engages the MWGB 130. Additionally, the plunger seal 200 may also comprise a rounded top portion 208 that provides structural rigidity to the plunger seal 200. In some embodiments, the rounded top portion 208 may form a cavity 210 within the plunger seal 200.

Plunger seal 200 is preferably formed from an elastomeric or otherwise semi-rigid flexible material. Plunger seal 200 is collapsible or deformable to selectively allow oil flow through the lubrication ports 172 of the MWGB 130. More specifically, as shown in FIG. 5A (corresponding to FIGS. 1 and 4A), when the retractable driveshaft 124 engages the MWGB 130, contact between the retractable driveshaft 124 and the driveshaft interface 206 of the plunger seal 200 displaces the driveshaft interface 206 and consequently the lower flange 204 of the plunger seal 200. When the retractable driveshaft 124 is fully engaged with the MWGB 130, the lower surface 205 of the lower flange 204 is axially displaced above or beyond the lubrication ports 172, thereby exposing the lubrication ports 172. Accordingly, oil passing over the splines 160, 170 may pass through the lubrication ports 172 and into the sump 176. However, before entering the sump 176, oil that passes through the lubrication ports 172 may also lubricate other components of the MWGB 130.

Further, as shown in FIG. 5B (corresponding to FIGS. 2 and 4B), when the retractable driveshaft 124 disengages the MWGB 130, contact between the driveshaft interface 206 and the retractable driveshaft 124 is broken, and the plunger seal 200 returns to its resting position. Thus, tension forces present in the upper flange 202 of the plunger seal 200 bias the plunger seal 200 towards the retractable driveshaft 124, thereby causing the lower surface 205 of the lower flange 204 of the plunger seal 200 to return axially below the lubrication ports 172. As such, the position of the lower flange 204 axially below the lubrication ports 172 prevents oil from passing through the lubrication ports 172. Thus, when the retractable driveshaft 124 is disengaged from the MWGB 130, the lubrication ports 172 are disposed between the upper flange 202 and the lower flange 204 of the plunger seal 200. In addition to preventing oil flow through the lubrication ports 172 when the retractable driveshaft 124 is disengaged from the MWGB 130, the plunger seal 200 also prevents contaminants from the outside environment from entering the lubrication ports 172 and consequently the sump 176. As such, it will be appreciated that the plunger seal 200 is adapted to interface with the retractable driveshaft 124 in order to selectively allow oil flow through the lubrication ports 172 in response to the engaged or disengaged status of the retractable driveshaft 124 with the MWGB 130.

Figure 6A:
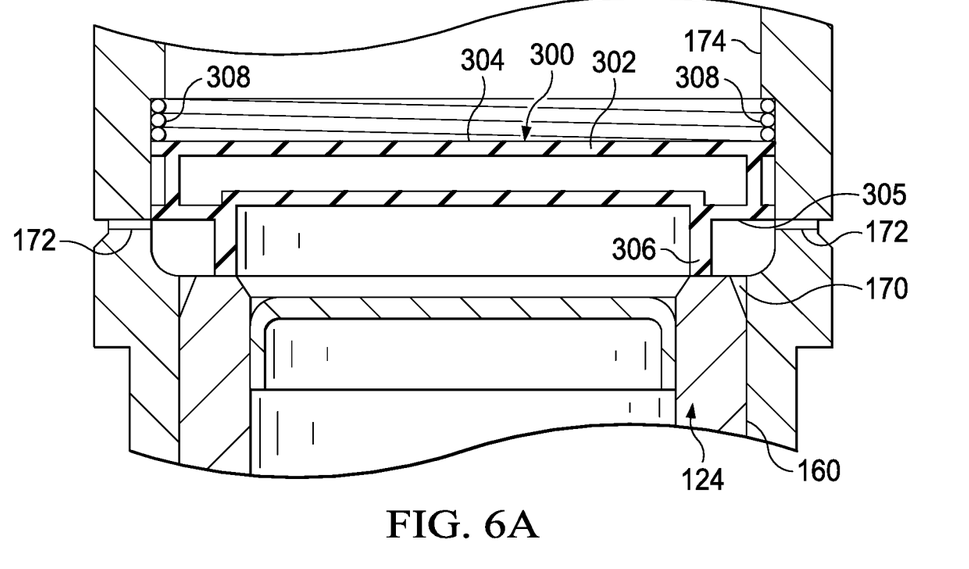
FIG. 6A is a cross-sectional side view of the drive system of FIG. 4A comprising another embodiment of a plunger seal according to this disclosure with the retractable driveshaft engaged with the MWGB.
Figure 6B:
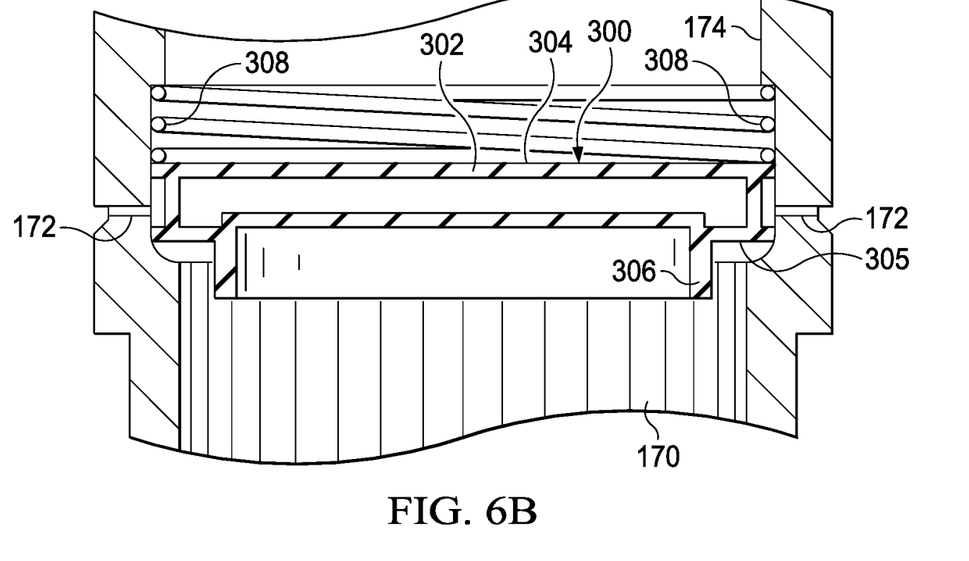
FIG. 6B is a cross-sectional side view of the plunger seal of FIG. 6A when the retractable driveshaft is disengaged from the MWGB.

Referring now to FIGS. 6A and 6B, cross-sectional side views of another embodiment of a plunger seal 300 are shown according to this disclosure with the retractable driveshaft 124 engaged and disengaged with the MWGB 130, respectively. Plunger seal 300 is configured to perform substantially similarly to plunger seal 200 and selectively allow oil flow through the lubrication ports 172 of the MWGB 130 in response to the engaged or disengaged status of the retractable driveshaft 124 with the MWGB 130. However, instead of comprising a collapsible or deformable seal, plunger seal 300 comprises an axially translatable seal. Plunger seal 300 comprises a body 302 comprising an upper surface 304 and a lower surface 305, a cylindrically-shaped driveshaft interface 306, and a spring 308. The plunger seal 300 is generally captured by or retained within the receiver 174 of the MWGB 130. Additionally, plunger seal 300 may be formed from a rigid or semi-rigid material, such as a polymer, an elastomer, a metal, or a combination of materials.

As shown in FIG. 6A (corresponding to FIGS. 1 and 4A), when the retractable driveshaft 124 engages the MWGB 130, contact between the retractable driveshaft 124 and the driveshaft interface 306 of the plunger seal 300 compresses the spring 308 and axially displaces the plunger seal 300. As such, when the retractable driveshaft 124 is fully engaged with the MWGB 130, the lower surface 305 of the plunger seal 300 is displaced axially above or beyond the lubrication ports 172, thereby exposing the lubrication ports 172. Accordingly, oil passing over the splines 160, 170 may pass through the lubrication ports 172 and into the sump 176 of the MWGB 130. However, before entering the sump 176, oil that passes through the lubrication ports 172 may also lubricate other components of the MWGB 130.

Further, as shown in FIG. 6B (corresponding to FIGS. 2 and 4B), when the retractable driveshaft 124 disengages the MWGB 130, contact between the driveshaft interface 306 and the retractable driveshaft 124 is broken, and the spring 308 biases the plunger seal 300 towards the retractable driveshaft 124, thereby causing the lower surface 305 of the plunger seal 300 to return axially below the lubrication ports 172. As such, the position of the lower surface 305 axially below the lubrication ports 172 prevents oil from passing through the lubrication ports 172. Thus, when the retractable driveshaft 124 is disengaged from the MWGB 130, the lubrication ports 172 are disposed between the upper surface 304 and the lower surface 305 of the plunger seal 300. In addition to preventing oil flow through the lubrication ports 172 when the retractable driveshaft 124 is disengaged from the MWGB 130, the plunger seal 300 also prevents contaminants from the outside environment from entering the lubrication ports 172 and consequently the sump 176. As such, it will be appreciated that the plunger seal 300 is adapted to interface with the retractable driveshaft 124 in order to selectively allow oil flow through the lubrication ports 172 in response to the engaged or disengaged status of the retractable driveshaft 124 with the MWGB 130.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A drive system for an aircraft, comprising:
a retractable driveshaft; and
an auxiliary component comprising a receiver and carried in a wing assembly of the aircraft; and
a plunger seal disposed in the receiver and configured to prevent flow of a lubricant through a plurality of lubrication ports formed in the receiver when the retractable driveshaft is disengaged from the receiver and allow flow of the lubricant through the lubrication ports formed in the receiver when the retractable driveshaft is engaged with the receiver;
wherein the retractable driveshaft comprises a plurality of splines configured to interface with a plurality of splines on the receiver when the retractable driveshaft engages the receiver, allowing for rotation of the driveshaft to cause rotation of the receiver.

2. The drive system of claim 1, wherein the plunger seal is captured within the receiver.

3. The drive system of claim 1, wherein the retractable driveshaft is configured to contact the plunger seal and displace at least a portion of the plunger seal when the retractable driveshaft engages the receiver.

4. The drive system of claim 3, wherein the plunger seal is at least one of collapsible, deformable, and axially translatable.

5. The drive system of claim 3, wherein displacement of at least a portion of the plunger seal exposes lubrication ports formed in the receiver to allow the lubricant from the splines of the retractable driveshaft and the receiver to pass through the lubrication ports.

6. The drive system of claim 5, wherein the retractable driveshaft comprises a plurality of lubrication ports configured to allow the lubricant to pass from an inner bore of the retractable driveshaft to the splines of the retractable driveshaft and the receiver.

7. The drive system of claim 5, wherein the plunger seal is biased towards the retractable driveshaft by at least one of an upper flange of the plunger seal and a spring.

8. The drive system of claim 7, wherein the plunger seal is configured to return to a resting position when the retractable driveshaft disengages the receiver to prevent the lubricant from passing through the lubrication ports formed in the receiver.

9. An aircraft, comprising:
a retractable driveshaft disposed at least partially in a fuselage of the aircraft;
a mid-wing gearbox ("MWGB") comprising a receiver and disposed in a wing assembly of the aircraft; and
a plunger seal disposed in the receiver and configured to prevent flow of a lubricant through a plurality of lubrication ports formed in the receiver when the retractable driveshaft is disengaged from the receiver and allow flow of the lubricant through the lubrication ports formed in the receiver when the retractable driveshaft is engaged with the receiver;

wherein the retractable driveshaft comprises a plurality of splines configured to interface with a plurality of splines on the receiver when the retractable driveshaft engages the receiver, allowing for rotation of the driveshaft to cause rotation of the receiver.

10. The aircraft of claim 9, wherein the wing assembly is rotatable relative to the fuselage.

11. The aircraft of claim 9, wherein the plunger seal is captured within the receiver.

12. The aircraft of claim 9, wherein the retractable driveshaft is configured to contact the plunger seal and displace at least a portion of the plunger seal when the retractable driveshaft engages the receiver.

13. The aircraft of claim 12, wherein the plunger seal is at least one of collapsible, deformable, and axially translatable.

14. The aircraft of claim 12, wherein displacement of at least a portion of the plunger seal exposes the lubrication ports formed in the receiver to allow the lubricant from the splines of the retractable driveshaft and the receiver to pass through the lubrication ports.

15. The aircraft of claim 14, wherein the retractable driveshaft comprises a plurality of lubrication ports configured to allow the lubricant to pass from an inner bore of the retractable driveshaft to the splines of the retractable driveshaft and the receiver.

16. The aircraft of claim 14, wherein the plunger seal is biased towards the retractable driveshaft by at least one of an upper flange of the plunger seal and a spring.

17. The aircraft of claim 16, wherein the plunger seal is configured to return to a resting position when the retractable driveshaft disengages the receiver to prevent the lubricant from passing through the lubrication ports formed in the receiver.

18. The aircraft of claim 1, wherein the aircraft comprises at least one of a fixed-wing aircraft and a vertical takeoff and landing (VTOL) aircraft.

* * * * *